J. F. O'CONNOR

March 24, 1931. FRICTION SHOCK ABSORBING MECHANISM Re. 18,012

Original Filed June 8, 1925 2 Sheets-Sheet 1

Witness

Wm. Geiger

Inventor

John F. O'Connor

By George I. Haight

His Atty.

J. F. O'CONNOR

March 24, 1931. FRICTION SHOCK ABSORBING MECHANISM Re. 18,012

Original Filed June 8, 1925 2 Sheets-Sheet 2

Witness
Wm. Geiger

Inventor
John F. O'Connor
By George D. Haight
His Atty.

Reissued Mar. 24, 1931

Re. 18,012

UNITED STATES PATENT OFFICE

JOHN F. O'CONNOR, OF CHICAGO, ILLINOIS, ASSIGNOR TO W. H. MINER, INC., OF CHICAGO, ILLINOIS, A CORPORATION OF DELAWARE

FRICTION SHOCK-ABSORBING MECHANISM

Original No. 1,633,269, dated June 21, 1927, Serial No. 35,701, filed June 8, 1925. Renewed April 18, 1927. Application for reissue filed May 17, 1928. Serial No. 278,569.

This invention relates to improvements in friction shock absorbing mechanisms.

One object of the invention is to provide a friction shock absorbing mechanism especially adapted for railway draft riggings, having high capacity combined with graduated action, wherein a plurality of relatively movable friction plates are employed to produce a heavy frictional resistance, the plates being bodily movable in unison during one of the stages of the graduated action for a predetermined portion of the compression stroke.

Another object of the invention is to provide a mechanism of the character indicated, including a friction shell having curved interior friction surfaces; wedge spreading means; a main spring resistance; a plurality of intercalated curved friction plates movable in unison with reference to the shell during a predetermined compression of the mechanism, means being provided comprising a carrier to which certain of the plates are anchored to arrest movement of said plates by engagement of the carrier with stop means on the shell and permit movement of the remaining plates with reference thereto during the remainder of the compression stroke to effect heavy final frictional resistance.

A further object of the invention is to provide a friction shock absorbing mechanism, including a friction shell having interior, opposed friction surfaces, friction means cooperating with the shell, including a plurality of intercalated, relatively movable, friction elements and pressure-transmitting spreading elements, wherein the cooperating friction surfaces of the elements of the friction means include curved, interengaging sets to enable the elements provided with the same to be in rocking relation, to equalize the pressure and permit the parts of the mechanism to automatically adjust themselves.

Other objects and advantages of the invention will more fully and clearly appear from the description and claims hereinafter following.

Figure 1:
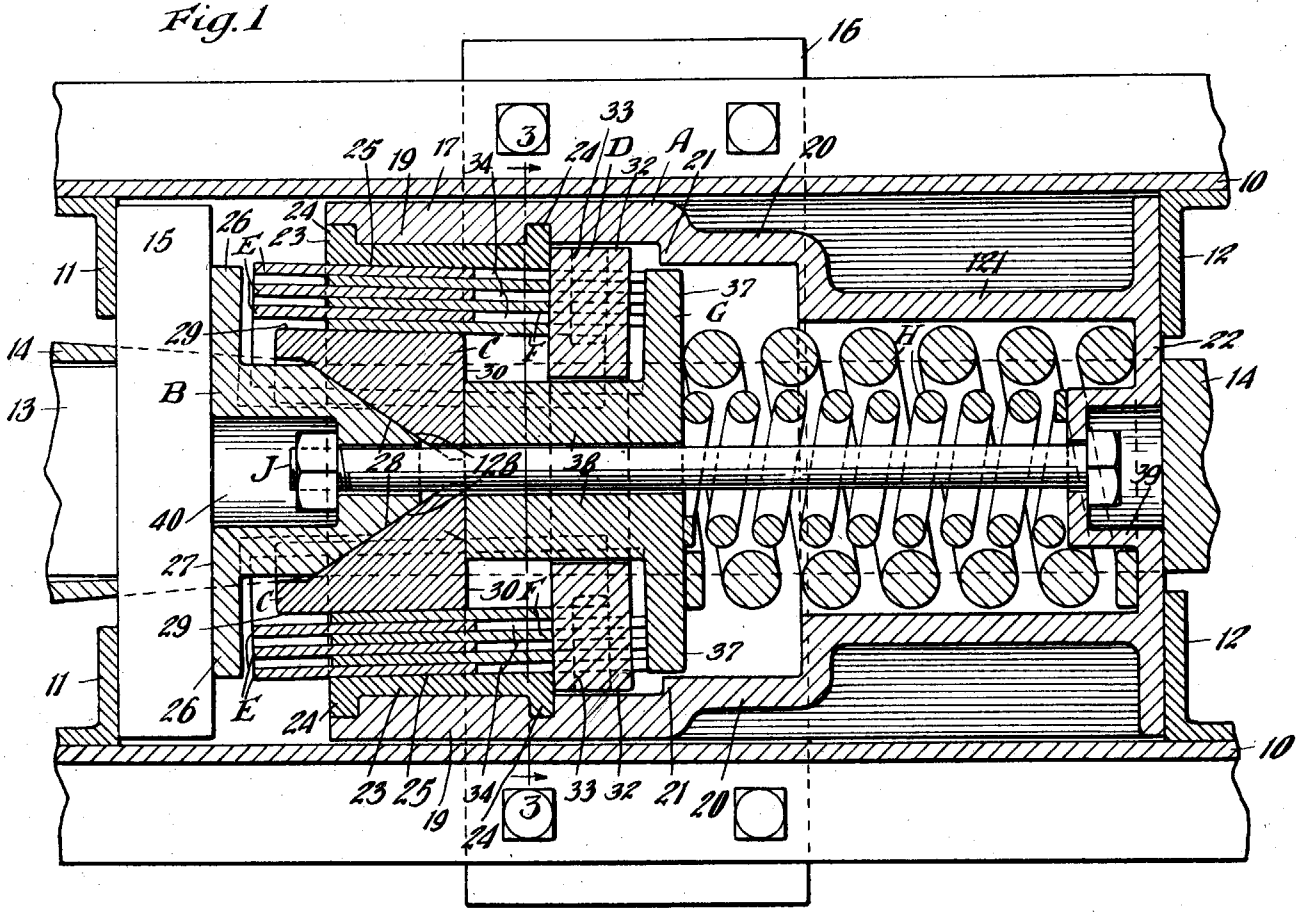
Figure 2:
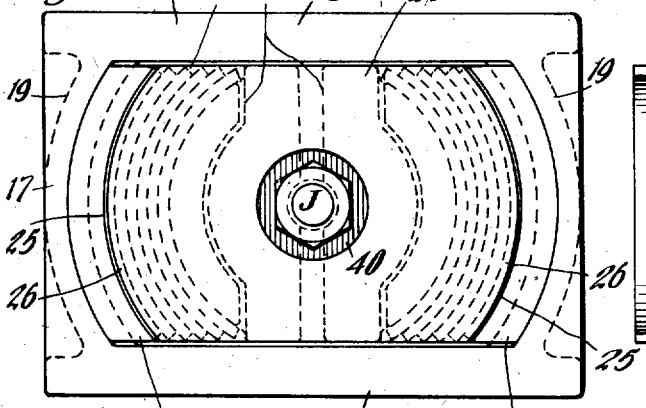
Figure 4:
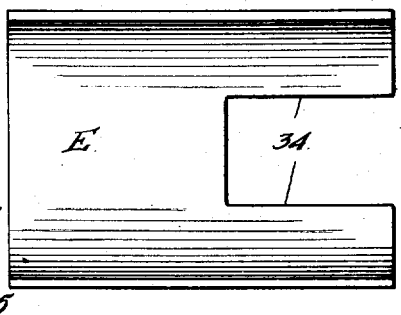
Figure 3:
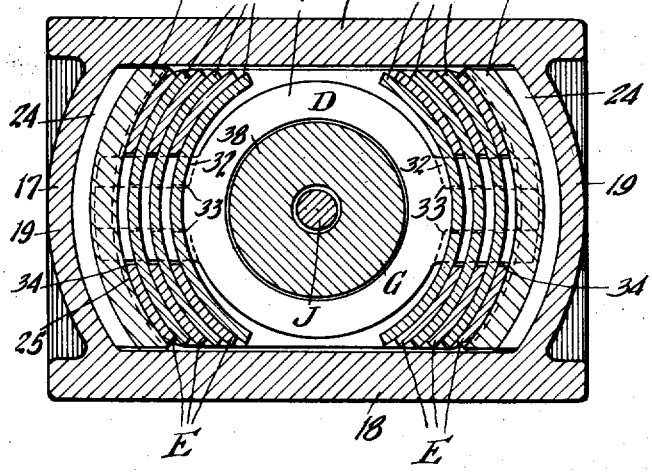
Figure 5:
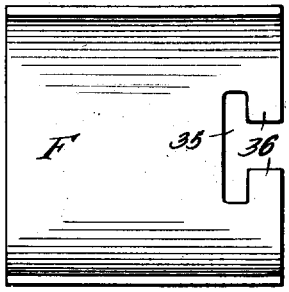

In the drawings, forming a part of this specification, Figure 1 is a longitudinal, horizontal, sectional view of a portion of the railway draft rigging, showing my improvements in connection therewith. Figure 2 is a front end elevational view of the shock absorbing mechanism proper. Figure 3 is a vertical, transverse, sectional view corresponding substantially to the line 3—3 of Figure 1. And Figures 4 and 5 are detailed, side elevational views respectively of two different friction plates used in connection with my improved mechanism.

In said drawings, 10—10 indicate channel-shaped center or draft sills of a railway car underframe, to the inner faces of which are secured front stop lugs 11—11 and rear stop lugs 12—12. The inner end portion of the drawbar is designated by 13, to which is operatively connected a hooded yoke 14 of well known form. The shock absorbing mechanism proper, as well as a front main follower 15, are disposed within the yoke. The yoke and the parts therewithin are operatively supported by a detachable saddle plate 16 fixed to the respective draft sills.

My improved shock absorbing mechanism proper, as shown, comprises broadly, a combined friction shell and spring cage casting A; a main wedge B; two friction-wedge-shoes C—C; a spider D; two sets of friction plates E and F; a spring follower G; a main spring resistance H; and a retainer bolt J. The casting A has the friction shell proper 17 formed at the forward end thereof. The friction shell has spaced, horizontally disposed flat top and bottom walls 18—18 and spaced curved side walls 19—19. The side walls 19 at the inner end of the friction shell are inwardly offset as indicated at 20—20, thereby providing vertically disposed alined shoulders 21—21 on the opposite sides of the shell. Rearwardly of the friction shell proper, the casting A is made of reduced section to provide a spring cage 121, the spring cage having a transverse end wall 22 adapted to cooperate with the rear stop lugs 12 in the manner of the usual rear follower. Each side wall 19 of the spring cage is provided with a liner 23 on the inner side thereof. Each liner 23 has a pair of laterally outwardly projecting flanges 24—24 at the front and rear ends thereof seated in suitable recesses provided in the corresponding side wall. The inner side of each liner is provided with a true cylindrical friction surface 25 inclined slightly with reference to the longitudinal axis of the mechanism. As will be evident, the opposed faces 25 of the two liners converge inwardly of the mechanism.

The wedge B is in the form of a relatively heavy block having a pair of laterally extending flanges 26 at the opposite sides thereof. At the forward end, the wedge B has a flat transverse face 27 adapted to bear on the inner side of the main follower 15. The main body portion of the wedge is provided with a pair of inwardly converging flat wedge faces 28 at the inner end thereof.

The friction shoes C, which are two in number, are disposed at the opposite sides of the wedge. Each shoe C has a longitudinally disposed outer true cylindrical friction surface 29 inclined slightly inwardly with reference to the longitudinal axis of the mechanism. On the inner side, each wedge friction shoe has a wedge face 128 correspondingly inclined to and adapted to cooperate with one of the wedge faces 28 of the main wedge B. At the rear end, each shoe C has a transverse flat face 30 adapted to bear on the spring follower G.

The spider D comprises a relatively heavy ring-like central section 31 from which project laterally a pair of horizontally disposed arms 32—32. Each of the arms 32 has a pair of inwardly extending slots 33—33 at the top and bottom sides thereof for a purpose hereinafter described. As most clearly shown in Figure 1, the arms 32 are of such a length that the outer ends thereof will cooperate with the inner ends of the liners 23 and the shoulders 21 of the shell to limit the movement of the spring with reference to the shell. The shoulders 21 are so spaced with reference to the inner ends of the liners that a predetermined amount of inward movement of the spider is permitted during the compression of the mechanism.

The friction plates E and F are arranged in two groups at opposite sides of the mechanism. Each group preferably comprises three plates E and three plates F, the plates E being alternated with the plates F. As most clearly shown in Figures 3 and 4, each of the plates E is of curved section having inner and outer true cylindrical friction surfaces. At the inner end, each plate E is centrally cut away as indicated at 34, thereby providing a pair of arms adapted to freely embrace the corresponding arm 32 of the spider. The openings 34 are of such a length as to permit the proper amount of inward movement of the plates E with reference to the spider during the compression of the mechanism. The outermost plate E has the convex outer friction surface thereof directly engaging the friction surface of the corresponding liner 23. The inner friction surface of this plate cooperates with the next adjacent plate F. The remaining two plates E of each group have their outer and inner friction surfaces respectively cooperating with the inner and outer friction surfaces of the two adjacent friction plates F.

The three friction plates F of each group are of like construction. As most clearly shown in Figures 3 and 5, the plates F are also of curved section and have inner and outer true cylindrical friction surfaces. The inner and outer friction surfaces of the outermost plates F of each group cooperate with the corresponding friction surfaces of the outermost plates E of that group while the innermost plate F of each group has the inner friction surface thereof cooperating with the corresponding friction surface 29 of the adjacent friction wedge shoe C. At the inner end, each friction plate F is provided with a T-shaped opening 35, thereby presenting a pair of inwardly extending lugs 36. The lugs 36 of each plate are adapted to engage within the top and bottom slots 33 of the corresponding arm 32 of the spider D. The three plates F of each group are thus anchored to the spider for movement in unison therewith.

As will be evident, the cooperating true cylindrical friction surfaces of the friction plates permit of relative rocking movement of the plates with respect to each other, and the cylindrical friction surfaces of the shoes and liners of the friction shell which engage with the cylindrical surfaces of the adjacent plates also permit of rocking movement, the parts of the friction means including the shoes thus having relative adjustment automatically, so that the wedge faces of the wedge block and shoes and the cooperating friction surfaces of the shoes, plates and liners seat properly at all times to provide true surface contact and substantially uniform distribution of pressure without requiring accurate fitting of the parts.

The spring follower G comprises a relatively heavy plate-like section 37 and a forwardly projecting cylindrical section 38. The section 38 of the spring follower is adapted to work freely within the ring portion 31 of the spider D and the outer end thereof is adapted to engage the flat rear faces 30 of the friction shoes C. As most clearly shown in Figure 1, the plate-like section of the follower projects beyond the opposite sides of the cylindrical portion thereof and is adapted to normally engage the rear ends of the plates E of the two groups.

The main spring resistance H comprises a relatively heavy outer coil and a lighter inner coil, the outer coil having its opposite ends bearing respectively on the end wall 22 of the casting A and the inner side of the spring follower G. The inner coil has its front end bearing on the spring follower G and its rear end bearing on an inwardly projecting hollow boss 39 on the transverse end wall 22 of the casting A.

The mechanism is held of overall uniform length and in assembled relation by the adjustable retainer bolt J which has its opposite ends anchored respectively to the hollow boss 39 of the spring cage and the main wedge B, the shank of the bolt extending through a longitudinal opening in the spring follower and the shoes being cut away at their inner side to accommodate the corresponding sides of said shank. The head of the bolt which is at the forward end thereof is accommodated for movement in an opening 40 provided in the wedge block B.

The normal position of the parts is that shown in Figure 1, the friction plates E being in their outermost position with their front ends spaced slightly from the flanges 26 of the wedge B. In this position of the parts, the spring follower is in engagement with the inner ends of the plates E and the inner ends of the shoes C. The spider D is in engagement with the inner ends of the liners 23, thereby maintaining the plates F in proper position.

Compensation for wear of the various friction and wedge faces is had by the expansion of the main spring resistance H which is placed under initial compression when the mechanism is assembled.

The operation of my improved shock absorbing mechanism proper, assuming a compression stroke, is as follows: The front follower 15 and the casting A will be moved relatively toward each other, carrying the wedge B inwardly of the friction shell, setting up a wedging action between the same and the friction shoes. During the initial compression of the mechanism, the friction shoes C will slip inwardly on the friction surfaces of the innermost plates F of the two groups. In this connection, it is pointed out that the friction wedge shoes and plates are of steel while the liners 23 of the friction shell are castings. Consequently, there will be less friction between the shoes and the innermost plates F than between the outermost plates E and the liners, thereby assuring the initial sliding action taking place between the shoes and the innermost friction plates.

The initial movement just described will continue until the outer ends of the plates E are engaged by the flanges 26 of wedge B, whereupon the plates E will be forced to move inwardly of the shell with the wedge B. In this connection it is pointed out that the inner surface of each flange 26 is preferably disposed at an angle of 90° to the axis of inclination of the cylindrical friction surfaces of the plates of the corresponding group, thereby assuring simultaneous engagement of all of the plates of said group of the flange 26, the outer edge faces of the plates of said group being also disposed at an angle of 90° to said axis of inclination. During the action last described, due to the friction existing between the various parts, the plates F will be carried inwardly in unison with the plates E. As the plates F are anchored to the spider D, the latter will also be carried inwardly of the friction shell. During this time, friction will be created between the friction shell and the outermost plates of the two groups. The last described action will continue until the arms of the spider engage the shoulders 21 of the friction shell, whereupon inward movement of the spider will be positively arrested, also arresting movement of the plates F. During the remainder of the compression stroke, the plates E will be forced to slide with reference to the plates F and the friction shoes will slide on the innermost plates F of each group, thereby greatly augmenting the resistance offered. As will be evident during the initial movement hereinbefore described, the plate-like section of the spring follower G will be moved out of contact with the inner ends of the plates E, thereby greatly facilitating release of the wedging system when the actuating force is removed, it being evident that the spring follower will act to release the wedge friction system before the inner ends of the plates E are engaged thereby. The compression of the mechanism will continue either until the actuating force is removed, or the follower 15 comes into engagement with the outer end of the casting A, whereupon the force will be transmitted directly through the latter, relieving the main springs from excessive pressure.

When the actuating pressure is reduced, the parts will be restored to normal position by the expansive action of the main spring resistance H. During the release action, the spring follower will first force the wedge friction shoes C outwardly, the plate-like section of the spring follower finally picking up the friction plates E and carrying the same outwardly of the shell. Due to the friction existing between the various friction plates, the plates F will be carried outwardly with the friction plates E until the arms 32 of the spider come into engagement with the inner ends of the liners 23, whereupon outward movement of the plates F will be positively arrested.

It will be evident from the preceding description, taken in connection with the drawings, that I have provided a high capacity gear having graduated action during the compression stroke. By providing the graduated action, my gear is particularly adapted for passenger car service, inasmuch as abrupt and sudden shocks are entirely eliminated due to the blending of the different stages of the compression.

While I have herein shown and described the preferred manner of carrying out my invention, the same is merely illustrative and I contemplate all changes and modifications that come within the scope of the claims appended hereto.

I claim:

1. In a friction shock absorbing mechanism, the combination with a friction shell having interior curved friction surfaces; of a follower, said shell and follower being relatively movable toward and from each other; two groups of curved friction plates disposed at opposite sides of the mechanism and cooperating with the friction surfaces of the shell, said two groups of plates being movable as a unit during relative movement of said shell and follower; means for arresting movement of certain of said plates of each group after a predetermined portion of the compression stroke to compel the remaining plates to move relatively thereto; a main spring resistance; and lateral pressure-creating means interposed between said two groups of plates for placing the same under lateral pressure upon relative movement of said shell and follower.

2. In a friction shock absorbing mechanism, the combination with a friction shell having longitudinally disposed curved friction surfaces; of a pressure-transmitting member, said members being relatively movable toward and away from each other; a carrier relatively movable to said friction shell; two sets of curved friction plates within the friction shell, each set comprising a plurality of plates alternated with the plates of the remaining set, certain of said plates being anchored to said carrier; means for limiting the relative movement of said carrier and friction member; lateral wedge-pressure creating means cooperating with said pressure-transmitting member for placing said plates under lateral pressure; and a main spring resistance.

3. In a friction shock absorbing mechanism, the combination with a friction shell having longitudinally disposed, inwardly converging curved friction surfaces; of a pressure-transmitting member, said member and shell being relatively movable toward and away from each other; a carrier having limited movement with reference to said friction shell; a plurality of intercalated relatively movable curved friction plates within the shell, certain of said plates being anchored to the carrier; means for limiting the relative movement of said carrier and friction shell; lateral pressure-creating means cooperating with said pressure-transmitting means for placing the plates under lateral pressure; and a main spring resistance, said entire spring resistance cooperating with said lateral pressure-creating means.

4. In a friction shock absorbing mechanism, the combination with a friction shell having opposed, longitudinally arranged curved friction surfaces; of a pressure-transmitting member having wedge means associated therewith, said member and shell being relatively movable toward and away from each other; a carrier relatively movable to said friction shell; two groups of curved friction plates at opposite sides of the shell and cooperating with the friction surfaces thereof, certain of said plates being anchored to said carrier; means for limiting the relative movement of said carrier and friction shell; friction wedge shoes interposed between said wedge and the two groups of friction plates; and a main spring resistance.

5. In a friction shock absorbing mechanism, the combination with a friction shell having interior curved friction surfaces disposed on opposite sides thereof; of two groups of friction plates cooperating respectively with the two friction shell surfaces, all of said plates being relatively movable in unison with respect to the shell during a portion of the compression stroke; a carrier having limited movement with reference to the shell and to which certain of the plates of each group are anchored, whereby relative movement of said last-named plates and shell is arrested after a predetermined compression of the mechanism; a wedge-friction system interposed between said two groups of plates, said system including a wedge pressure transmitting member and a pair of friction shoes, said shoes having longitudinally disposed curved friction surfaces cooperating with the curved friction surfaces of the innermost plates; and a main spring resistance.

6. In a friction shock absorbing mechanism, the combination with a friction shell having interior curved friction surfaces converging inwardly of the mechanism; of a lateral wedge-pressure-creating means; a group of curved friction plates interposed between each shell friction surface and said lateral wedge-pressure-creating means; a carrier having limited movement with reference to the shell, certain of said plates being anchored to the carrier and the remainder of the plates being movable relatively thereto; a main spring follower cooperating with the wedge-pressure-creating means and said movable plates for restoring the same to normal position; and a main spring resistance cooperating with said spring follower.

7. In a friction shock absorbing mechanism, the combination with a friction shell having interior curved friction surfaces; of a pressure-transmitting member having wedge means associated therewith, said member and shell being relatively movable toward and from each other; two groups of relatively movable friction plates disposed at opposite sides of the mechanism; a carrier having limited movement with reference to the friction shell, certain of said plates of each group being anchored to said carrier and the remaining plates having their front ends normally slightly spaced from said pressure-transmitting member to provide for preliminary action; wedge-friction shoes interposed between said wedge and said groups of plates; and a main spring resistance cooperating with said wedge-friction shoes.

8. A draft gear including a load-sustaining column member; relatively movable intercalated friction members supported by said column member, which is in frictional engagement with the adjacent intercalated members, the intercalated members adjacent the latter members being in frictional engagement therewith; means for pressing said intercalated members and column member into frictional engagement, where adjacent, some of the engaging pressure-transmitting surfaces being curved to enable the elements carrying them to be in rocking relation to equalize pressure on these elements; and means for returning actuated members to released position upon relief of draft strains.

9. A draft gear including a load-sustaining column member; relatively movable intercalated friction members supported by said column member, which is in frictional engagement with the adjacent intercalated members, the intercalated members adjacent the latter members being in frictional engagement therewith; means, subject to draft strains, for setting up pressure on said friction members, engaging friction surfaces of said column and some of said members being curved to enable the elements carrying them to be in rocking relation to equalize pressure on these elements; and means for returning the parts to a released position after draft stresses are relieved.

10. A draft gear including a load-sustaining column member; relatively movable intercalated friction members supported by said column member, which is in frictional engagement with the adjacent intercalated members, the intercalated members adjacent the latter members being in frictional engagement therewith; means for pressing said intercalated members and column member into frictional engagement, where adjacent, some of the engaging pressure transmitting surfaces being substantially cylindrical and coaxial to enable the elements carrying them to be in rocking relation to equalize pressure on these elements; and means for returning actuated members to released position upon relief of draft strains.

11. A draft gear including a load sustaining column member; relatively movable intercalated friction members supported by said column member which is in frictional engagement with the adjacent intercalated members, the intercalated members adjacent the latter members being in frictional engagement therewith; means, subject to draft strains, for setting up pressure on said friction members, engaging friction surfaces of said column and some of said members being substantially cylindrical and coaxial to enable the elements carrying them to be in rocking relation to equalize pressure on these elements; and means for returning the parts to a released position after draft stresses are relieved.

12. A draft gear including a load sustaining column member; relatively movable intercalated friction members supported thereby, each surface of two pairs of engaging pressure transmitting surfaces being curved to enable the elements carrying them to be in rocking relation to equalize pressure on these elements, each of these pairs of surfaces sloping with respect to the other; means for pressing the friction members into frictional engagement; and means for returning actuated members to released position upon relief of draft strains.

13. A draft gear including a load sustaining column member; relatively movable intercalated friction members supported thereby, two of which are respectively in frictional engagement with two surfaces of said column member; means, subject to draft strains, for setting up pressure on said friction members, engaging friction surfaces of said column and some of said members being curved to enable the elements carrying them to be in rocking relation to equalize pressure on these elements, each of these pairs of surfaces sloping with respect to the other; and means for returning the parts to a released position after draft stresses are relieved.

14. A draft gear including a load sustaining column member; relatively movable intercalated friction members supported thereby, each surface of two pairs of engaging pressure transmitting surfaces being substantially cylindrical, such surfaces of each pair being coaxial to enable the elements carrying them to be in rocking relation to equalize pressure on these elements, each of these pairs of surfaces sloping with respect to the other; means for pressing the friction members into frictional engagement; and means for returning actuated members to released position upon relief of draft strains.

15. A draft gear including a load sustaining column member; relatively movable intercalated friction members supported thereby, two of which are respectively in frictional engagement with two surfaces of said column member; means, subject to draft strains, for setting up pressure on said friction members, engaging friction surfaces of said column and some of said members being substantially cylindrical and coaxial to enable the elements carrying them to be in rocking relation to equalize pressure on these elements, each of these pairs of surfaces sloping with respect to the other; and means for returning the parts to a released position after draft stresses are relieved.

16. A draft gear including a load sustaining column member; relatively movable intercalated friction members supported by said column member, which is in frictional engagement with the adjacent intercalated members, the intercalated members adjacent the latter members being normally stationary with respect to said column member; means for pressing said intercalated members and column member into frictional engagement, where adjacent, some of the engaging pressure transmitting surfaces being curved to enable the elements carrying them to be in rocking relation to equalize pressure on these elements; and means for returning actuated members to released position upon relief of draft strains.

In witness that I claim the foregoing, I have hereunto subscribed my name this 14th day of May, 1928.

JOHN F. O'CONNOR.